United States Patent Office 3,686,085
Patented Aug. 22, 1972

3,686,085
POLYMERIZATION OF TETRAOXANE IN THE PRESENCE OF AN IODINE OR BROMINE INITIATOR
Akihiko Ito, Yoshiaki Nakase, Masaru Yoshida, Masahiro Sakamoto, and Isao Kaetsu, Takasaki-shi, Tadashi Iwai, Miura-gun, Koichiro Hayashi, Sapporo-shi, and Seizo Okamura, Kyoto, Japan, assignors to Japan Atomic Energy Research Institute, Tokyo, Japan
No Drawing. Filed July 28, 1970, Ser. No. 59,026
Claims priority, application Japan, July 29, 1969, 44/59,880; Sept. 6, 1969, 44/70,675; Oct. 9, 1969, 44/80,869; Dec. 22, 1969, 44/103,271; Jan. 16, 1970, 45/4,289
Int. Cl. C08d 1/00; C08f 1/16, 3/40
U.S. Cl. 204—159.21                 20 Claims Iodine or bromine is advantageously employed as an initiator in the polymerization of tetraoxane. The polymerization yield is increased when a halogenohydrocarbon is used as an initiator in addition to iodine or bromine. An oxymethylene polymer having excellent heat-stability is obtained by adding an acetal or acetals to the polymerization system. Also, the polymerization is further promoted by means of an ionizing radiation or an ultraviolet light.

BACKGROUND OF THE INVENTION

It is well known to polymerize formaldehyde, trioxane or tetraoxane by means of a cationic catalyst such as a Lewis acid or an ionizing radiation. However, the catalysts used in the conventional process are highly reactive and unstable, and therefore, they must be handled with extreme care. There is a further disadvantage in the use of a Lewis acid in that the Lewis acid must be neutralized after the polymerization is completed. The disadvantage of radiation polymerization is that the polymerization rate is low.

The oxymethylene polymers obtained by polymerizing formaldehyde, trioxane or tetraoxane by means of a known cationic catalyst such as Lewis acid or an ionizing radiation are inadequate in thermal stability and are easily depolymerized. Therefore, these polymers require some additional stabilization treatment such as the blockings of their chain ends in order that they may be commercially practicable. According to one conventional process, a produced oxymethylene polymer is further treated with acetic anhydride in order to acetylate the chain end thereof; in another process, formaldehyde or trioxane is polymerized in the presence of one or more copolymerizable substances so that a thermally stable copolymer is obtained.

It is known to polymerize trioxane in the presence of a free halogen as an initiator. For example, (i) British Pat. No. 875,558 or Japanese patent publication No. 20,384/61 teaches polymerization of trioxane by means of an initiator consisting of chlorine, bromine or iodine; (ii) use of chlorine as the initiator is reported in Annual Report of the Japanese Association for Radiation Research on Polymer, vol. 6, pp. 181–188, 1965; (iii) Japanese patent publication No. 3,467/66 teaches the use of iodine as an polymerization initiator.

However, the above processes (i)–(iii) include many defects with respect to polymerization rate (velocity), thermal stability of the polymer and the polymerization operation etc. as shown below:

(1) In these processes, a large amount of a free halogen is required for the polymerization of trioxane. According to experiments carried out by the present inventors, the degree of polymerization of the polymers obtained by these processes is low and, also, they are inferior in thermal stability.

(2) In processes (i) and (ii), even though a large amount of free halogen is used, the polymerization rate is slow.

(3) In process (iii), polymerization rate is improved somewhat by employing solid phase polymerization. However, complicated operations are required in that trioxane and iodine are mixed by sublimation at a temperature not higher than 0° C. and polymerization is carried out at a reduced pressure not higher than 1 mm. Hg.

(4) Furthermore, in process (ii), it is reported that tetraoxane was polymerized using a large amount of chlorine as the initiator. However, in this case, it was noted that a large amount of hydrogen chloride is generated and, in conjunction with this, the polymer is depolymerized.

Unexpectedly, the inventors have found that tetraoxane is advantageously polymerized by employing iodine or bromine as the initiator, and the present invention eliminates many defects inherent in the above prior art processes. According to the present invention, an oxymethylene polymer can be obtained at a high polymerization rate and in high yield in either solid or liquid phase by using a small amount of the initiator. It is surprising that iodine or bromine acts as an excellent initiator in the polymerization of tetraoxane, since a free halogen consisting of iodine, bromine or chlorine is not effective in the same degree in the polymerization of trioxane and chlorine is not suitable as an initiator in the polymerization of tetraoxane.

The inventors invented a process for polymerizing tetraoxane by using a halogenohydrocarbon as the initiator (U.S. Ser. No. 867,933; British application No. 52,516/69; German application No. P 19 52 820.2; French application No. 6936641; Dutch application No. 6916033). It has been found that a synergistic effect is exhibited in the increase of both the polymerization rate and the polymerization yield, when a halogenohydrocarbon is employed in addition to iodine or bromine in the polymerization of tetraoxane.

Also, the inventors invented a process for preparing a thermally stabilized oxymethylene polymer which comprises polymerizing tetraoxane in the presence of a cyclic acetal and/or an acyclic acetal (U.S. Ser. No. 1,051; British applications Nos. 2,263/70, and 15,094/70; German applications Nos. P 20 01 396.1, and P 20 15 063.4; French applications Nos. 7001548, and 7010872; Canadian application No. 78,775; Italian application No. 22,648/70; Belgian application No. 87,087; Dutch application No. 7004531). It has been found that an oxymethylene polymer having excellent heat-stability is obtained by polymerizin tetraoxane in the presence of both iodine or bromine and an acetal or acetals in high yield within shorter polymerization time. Such a stable and practicable oxymethylene polymer could not be obtained according to a prior art in which a combination of trioxane and a halogen or that of tetraoxane and chlorine was employed even in the presence of an acetal. Furthermore, the amount of iodine or bromine to be added can be reduced if desired, since the polymerization rate is increased by addition of an acetal.

SUMMARY OF THE INVENTION

This invention relates to a novel process for preparing an oxymethylene polymer and to said novel oxymethylene polymer, and comprises polymerizing tetraoxane in the presenec of at least iodine or bromine.

The inventors have studied a series of initiators for the polymerization of tetraoxane and have found that iodine or bromine has an excellent effect as the initiator, and have completed the present invention.

More particularly, in the polymerization of tetraoxane, when iodine or bromide is used as the initiator, even a very small amount achieves both high polymerization rate and high polymerization yield. Said effect is further increased by employing a halogenohydrocarbon in addition to said initiator. Furthermore, an oxymethylene polymer having excellent heat-stability is obtained at an increased polymerization rate when an acetal or acetals are used in addition to iodine or bromine. In these cases, even better results are attained by irradiation with an ionizing radiation or an ultraviolet light prior to or in the course of polymerization.

In the other words, the gist of the present invention resides in employing iodine or bromine as the initiator in the polymerization of tetraoxane. The present invention includes the combined use of iodine or bromine with a halogenohydrocarbon as the initiator, an acetal or acetals as the additive and irradiation of an ionizing radiation or an ultraviolet light. The polymerization can be carried out either in solid phase or in liquid phase.

The halogenohydrocarbon to be employed in the present invention is represented by the following formula;

$$RX_n$$

wherein R is a radical having 1 to 15 carbon atoms selected from the group consisting of a saturated or unsaturated aliphatic hydrocarbon residue, a saturated or unsaturated alicyclic hydrocarbon residue and a radical in which any hydrogen atom of the residues is substituted for aryl, alkoxy, carbonyl, alkoxycarbonyl or aryloxycarbonyl radical; X is the same or different kind of halogen atoms selected from the group consisting of F, Cl, Br and I; and $n$ is a positive integer not exceeding 10. Said halogenohydrocarbon is typically exemplified by methylene chloride, ethylene chloride, chloroform, carbon tetrachloride, vinyl chloride, chloral, chloroacetone, chloromethyl acetate, phenyl chloroacetate, hexachloroethane, benzyl chloride, tetrafluoroethylene, dibromotetrafluoroethane, bromoform, tribromoacetaldehyde, aryl bromide, methyl bromide, ethyl bromide, methylene bromide, ethylene bromide, bromal, bromopropene, bromocyclohexane, chlorocyclohexane, benzyl bromide, methyl iodide, ethyl iodide, propyl iodide, isopropyl iodide, ethylene iodide, benzyl iodide, iodoform, 2-bromoethyl ethyl ether, chloroethyl ethyl ether, 2-chloroethyl ether, 3-bromocyclohexene, 3-chlorocyclohexene, and 4-chlorocyclohexene.

The acetal to be employed in the present invention is represented by the general Formulas I and/or II.

(I)

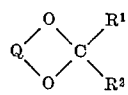

(hereinafter referred to as a cyclic acetal) wherein Q is a member selected from the group consisting of an unsubstituted or substituted aliphatic hydrocarbon residue having 2 to 10 carbon atoms and an unsubstituted or substituted aliphatic hydrocarbon residue containing C—O—C linkages and having 2 to 10 carbon atoms, the substituent on the aliphatic hydrocarbon residue being selected from the group consisting of alkyl, alkenyl, phenyl, and halogens; and $R^1$ and $R^2$ each are members selected from the group consisting of a hydrogen atom or an aliphatic hydrocarbon residue having 1 to 3 carbon atoms. The cyclic acetals may be exemplified by 1,3-dioxolane, 1,3-dioxane, 1,3-dioxepane, 1,3-dioxecane, 1,3,5-trioxepane, 1,3,6-trioxocane, 4-methyl-1,3-dioxolane, 4-phenyl-1,3-dioxane, 5-ethyl-4-phenyl-1,3-dioxane, 4-methyl-4-phenyl-1,3-dioxane, 2-methyl-4-methylene-1,3-dioxolane, 1,3-dioxep-5-ene, 1,3-dioxen-6-ene, 5-ethyl-1,3-dioxep-5-ene, and 2-isopropyl-1,3-dioxep-5-ene.

(II)

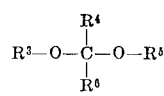

(hereinafter referred to as an acyclic acetal) wherein $R^3$ and $R^5$ each are members selected from the group consisting of an aliphatic hydrocarbon residue having 1 to 4 carbon atoms and a substituted aliphatic hydrocarbon residue having 1 to 8 carbon atoms, the substituent being selected from the group consisting of alkyl, alkoxy, and halogens; and $R^4$ and $R^6$ each are members selected from the group consisting of a hydrogen atom and an aliphatic hydrocarbon residue having 1 to 3 carbon atoms. The acyclic acetals may be exemplified by dimethoxymethane (methylal), diethoxymethane (ethylal), diethoxyethane, 1,1-diethoxypropane, dipropoxymethane, dibutoxymethane, methoxybutoxymethane, 1,1-dibutoxypropane, 1,1-diethoxybutane, and 2,2-dimethoxypropane.

The amount of iodine to be added is generally $10^{-5}$–$1\%$ by weight, preferably $10^{-2}$–$10^{-1}\%$ by weight of tetraoxane. The amount of bromine is generally $10^{-5}$–$1\%$ by weight, preferably $10^{-3}$–$10^{-1}\%$ by weight of tetraoxane. The abovementioned amount of iodine or bromine can be reduced when polymerization is carried out in the presence of an acetal and/or a halogenohydrocarbon, and/or by means of an ionizing radiation or an ultraviolet light. When a combination of initiator, additive and radiation is used, the amount of iodine or bromine to be added is preferably $10^{-4}$–$10^{-2}\%$ by weight of tetraoxane.

The amount of halogenohydrocarbon is generally $10^{-5}$–$5\%$ by weight of tetraoxane, although it can be reduced or increased according to the species thereof. Two or more species of the halogenohydrocarbon can be employed in combination if desired.

The amount of acetal or acetals to be added is generally 0.001–15% by weight, preferably 0.01–10% by weight of tetraoxane. When both an acyclic acetal and a cyclic acetal are employed, a synergistic effect is exhibited on the thermal stability of the polymer produced.

In the process of this invention, in addition to the use of iodine or bromine (if desired, together with a halogenohydrocarbon) as initiator, the irradiation of an ionizing radiation or an actinic light can be utilized. Combining the use of the initiator with the irradiation serves to improve the polymerization rate. The polymerization effected by combining the two is essentially different from the normal radiation-induced polymerization, since the radiation-induced polymerization of tetraoxane without the initiator can only proceed in solid phase, whereas when the two are combined the polymerization even in liquid phase is remarkably accelerated by irradiation. The useful radiations include alpha rays, beta rays, gamma rays, electron beam, X-rays, neutron beam, beams of heavy particles and combination thereof. An actinic light such as ultraviolet light from a mercury lamp etc. can also be used.

In accordance with the present invention, polymerization is carried out as follows:

An initiator consisting of iodine or bromine and if desired a halogenohydrocarbon, and if desired an additive consisting of an acetal or acetals are mixed with tetraoxane. The initiator and the additive can be added simultaneously or separately by various ways, and the order of addition generally makes no substantial difference in the effect of polymerization. However, since a cyclic acetal is quickly polymerized in the presence of a halogenohydrocarbon, it is preferable not to mix them prior to the addition to tetraoxane. Better results are obtained if some or all of the acetal or acetals is added to the tetraoxane successively or intermittently in the course of polymerization, although all of the acetal or acetals can be added prior to the polymerization.

Upon addition of the initiator and/or the additive to tetraoxane, they can be added after being dissolved separately or simultaneously in a solvent inactive to tetraoxane and formaldehyde. Especially, iodine or bromine is preferably added in the form of solution in order to add it uniformly to the solid phase polymerization system, since it is generally employed in a small amount. When a rather volatile compound is used in the polymerization or the pressure of the polymerization system is higher than the atmospheric pressure, the polymerization is carried out in a sealed vessel.

In the case of solid phase polymerization, the initiator and/or the additive are added to crystalline tetraoxane in the form of drops, spray or vapor, or they are melt-mixed with tetraoxane and solidified. In liquid phase polymerization, they are added to the liquid phase containing tetraoxane, or they are mixed with tetraoxane and then the mixture is melted or dissolved in a solution. Furthermore, in liquid phase polymerization, polymerization is carried out by contacting a gaseous initiator with the surface of a liquid comprising tetraoxane.

The polymerization according to the present invention can be carried out in a liquid phase in which the polymerization system comprising tetraoxane is melted or uniformly dissolved in a solvent such as cyclohexane, diethyl ether, nitrobenzene etc. inactive to tetraoxane and formaldehyde, in a suspension state in which either tetraoxane or tetraoxane and an acetal are suspended in said solvent, or in a solid phase in which tetraoxane exists in crystalline state even when a liquid compound consisting of a polymerization initiator an additive and/or a solvent for iodine or bromine is added to tetraoxane. From the viewpoint of the thermal stability of the polymer, a solid phase polymerization is preferable. The other merits of solid phase polymerization are for example (a) the higher rate of polymerization compared with that of liquid phase polymerization, in the presence of the same amount of a polymerization initiator; (b) the negligible amount of trioxane formed in the course of polymerization; and (c) the small increase in stirring power of the reactor throughout the whole polymerization process even when the polymer yield attains almost 100%.

When irradiation is employed in the course of polymerization (hereinafter referred to as in-source polymerization), the dose rate is generally in the range of $10^2$–$10^8$ rad/hr. and the dose is generally $10^2$–$10^8$ rads; and when the post-effect of preirradiation is utilized in the polymerization (hereinafter referred to as post-polymerization), the dose is generally $10^2$–$10^8$ rads. In the case of in-source polymerization (including light irradiation), the irradiation temperature is identical with that of polymerization. In the case of post-polymerization (including light irradiation), the irradiation temperature must be within the range in which tetraoxane is in the solid state. The post-polymerization can be carried out by irradiation of either tetraoxane or a mixture of tetraoxane and an initiator. When irradiation is carried out at a temperature higher than 30° C., in-source polymerization proceeds except for the case in which the irradiation time is very short. However, post-polymerization can, of course, be effected thereafter. Though the polymerization can be conducted at a temperature ranging from 30° C. to 150° C., desirable results are obtained when polymerization is carried out at a temperature between about 90° C. and about 140° C. Even when the temperature of the heating bath is higher than the melting point of tetraoxane, polymerization may proceed in the solid state during temperature raise. There is no restriction, either, with respect to the atmosphere in which polymerization is carried out. That is, polymerization can be carried out either in air, vacuum or an inert gas. In-source polymerization means polymerization which proceeds during irradiation by means of an ionizing radiation or an actinic light. Postpolymerization means polymerization which proceeds after irradiation, in the absence of the radiation source. The term "solid phase polymerization" referred to herein means polymerization carried out when the tetraoxane exists in the solid state (including dispersion), and "liquid phase polymerization" means polymerization carried out when the system containing tetraoxane is in the liquid state.

After polymerization, the reaction mixture is washed with a solvent such as acetone, benzene, etc. which is a good solvent for either tetraoxane, the initiator or the additive so that the produced polymer may be separated from the unreacted materials.

As seen in the following working examples, if suitable polymerization conditions are set up, polymer is obtained in almost 100% yield, and therefore the process of this invention is extremely advantageous from the commercial view in that no means for recovery of unreacted monomer is required.

The main characteristics and advantages obtained by this invention can be summarized as follows:

(i) Compared with the polymerization of trioxane in the presence of a free halogen, an extremely low concentration of an initiator consisting of bromine or iodine achieves both high polymerization rate and high yield in the polymerization of tetraoxane. It represents a considerable commercial merit in the production of the polymer.

(ii) The addition of an acetal in the presence of the polymerization initiator has a synergistic effect; it enhances the thermal stability of the polymer and also leads to an improved polymer yield.

(iii) The concomitant use of a halogenated hydrocarbon polymerization initiator with iodine or bromine is conducive to a polymer yield higher than the yields obtainable by using either iodine, bromine or a halogenohydrocarbon initiator. This is also due to a synergistic effect of the initiators.

(iv) The use of iodine or bromine and an acetal, if desired together with a halogenohydrocarbon, leads to the production of an oxymethylene polymer having significantly improved heat-stability in a higher yield.

(v) In any of the above situations, an ionizing radiation or an ultraviolet light may be employed as well, whereby the amount of a polymerization initiator may be decreased. This effect is considered to be due to the formation of a charge transfer complex by the iodine or bromine radicals.

DETAILED DESCRIPTION OF THE
PREFERRED EMBODIMENTS

Now the invention is illustrated by way of working examples. These examples are included for better understanding of the invention and should not be taken as limiting the scope of the invention. The product of each of the examples is a white crystalline substance. The melting points of the polymers obtained according to the following examples range from 150° to 180° C. The intrinsic viscosity number ($\eta$) is determined with respect to a solution in p-chlorophenol containing 2% $\alpha$-pinene at 60° C. The thermal stability of the polymer is indicated as $K_{222}$ (percent/minute) which means average thermal decomposition rate when the polymer is heated at 222° C. for 1 hour under nitrogen stream. The amount of the initiator or the additive is indicated in percentage on the basis of the weight of tetraoxane.

EXAMPLE 1

Two (2) grams of tetraoxane purified by sublimation was put in a glass ampoule and 1 mg. of powdery iodine was added thereto. The ampoule was sealed and kept at room temperature for 24 hours. Then, polymerization was carried out for 1 hour in a 105° C. heating bath. The product was washed with acetone in order to remove the remaining tetraoxane and iodine, and dried at room temperature at a reduced pressure. A crystalline polymer was obtained in 95% yield. The intrinsic viscosity number [η] (hereinafter referred to as [η]) of the polymer was 6.5.

EXAMPLE 2

One (1) gram of the sublimed tetraoxane was put in a glass ampoule, and iodine dissolved in benzene was added thereto in the amount of 0.01% as iodine by weight of tetraoxane. The ampoule was sealed and kept at room temperature for 24 hours. Polymerization was carried out for 1 hour in a 105° C. heating bath. After washing and drying, a crystalline polymer of [η]=4.4 was obtained in 95% yield.

EXAMPLE 3

One (1) gram of the sublimed tetraoxane was put in a glass ampoule, and iodine dissolved in cyclohexane was added thereto in the amount of 0.001% as iodine by weight of tetraoxane. The ampoule was sealed and kept at room temperature for 24 hours, and was irradiated with $1 \times 10^6$ rad gamma rays from Co-60 at —78° C. Then, polymerization was carried out for 1 hour in a 105° C. heating bath. After washing and drying as in Example 1, a crystalline polymer of [η]=4.0 was obtained in 93% yield.

For comparison, the above experiment was repeated without addition of iodine. A polymer of [η]=1.5 was obtained in 43% yield. When iodine was added and gamma rays were not employed in the polymerization, a polymer of [η]=2.6 was obtained in 14% yield.

EXAMPLE 4

Example 3 was repeated by employing ultraviolet light from a mercury lamp (Toshiba H400-P Type) instead of gamma rays. A crystalline polymer of [η]=3.0 was obtained in 20% yield.

When the above experiment was carried out without addition of iodine, no polymer was obtained.

EXAMPLE 5

One (1) gram of the sublimed tetraoxane was put in a glass ampoule and 0.001% of iodine was added. The ampoule was sealed and kept at room temperature for 100 hours. Polymerization was carried out for 1 hour in a 90° C. heating bath by irradiation of gamma rays from Co-60 at the dose rate of $5 \times 10^4$ rad/hr. A crystalline polymer of [η]=1.1 was obtained in 40% yield.

For comparison, the above experiment was repeated in the absence of iodine or gamma rays. When no iodine was employed, a polymer of [η]=1.0 was obtained in 25% yield. When no irradiation was employed, a polymer of [η]=1.0 was obtained in 10% yield.

EXAMPLE 6

Five (5) grams of tetraoxane was heated at 130° C., and 0.01% of iodine was added to the molten tetraoxane. Tetraoxane was quickly polymerized and the polymerization yield reached 70% in 1 hour. Viscosity [η] of the polymer obtained was 1.0.

EXAMPLE 7

Example 6 was repeated by employing irradiation with ultraviolet light from a mercury lamp (Toshiba H400-P Type) in the course of polymerization. Polymerization rate was accelerated thereby and the yield reached 86% in 1 hour. Viscosity [η] of the polymer was 1.2.

In contrast, no polymer was obtained, when the experiment was carried out by employing ultraviolet light without addition of iodine.

EXAMPLE 8

Example 7 was repeated by employing gamma rays at the dose rate of $5 \times 10^4$ rad/hr. from Co-60 instead of ultraviolet light. A polymer of [η]=1.5 was obtained in 94% yield by the polymerization for 1 hour. No polymer was obtained when no iodine was added thereto.

EXAMPLE 9

One (1) gram of tetraoxane was melted in a glass ampoule by a 120° C. heating bath and 0.001% of iodine was added thereto. The mixture was polymerized at 120° C. for 1 hour. A polymer of [η]=1.1 was obtained in 43% yield.

EXAMPLE 10

Example 9 was repeated by employing gamma rays irradiation from Co-60 at the dose rate of $1 \times 10^5$ rad/hr. during the polymerization (1 hour). A polymer of [η]=0.4 was obtained in 53% yield.

EXAMPLE 11

One (1) gram of tetraoxane was dissolved in 1 ml. of nitrobenzene at 120° C. and 0.001% of iodine was added thereto, and then the mixture was polymerized at 120° C. for 1 hour. A polymer of [η]=0.4 was obtained in 6.5% yield.

EXAMPLE 12

Example 11 was repeated by employing irradiation of gamma rays from Co-60 at the dose rate of $1 \times 10^5$ rad/hr. during the polymerization (1 hour). A polymer of [η]=0.7 was obtained in 32% yield.

EXAMPLE 13

One (1) gram of tetraoxane was melted at 130° C. and polymerized for 1 hour by adding 0.001% of iodine thereto. A polymer of [η]=0.6 was obtained in 62% yield.

EXAMPLE 14

Two (2) grams of tetraoxane was dissolved in 2 grams of nitrobenzene at 130° C. and iodine dissolved in cyclohexane was added thereto in the amount of 0.025% by weight of tetraoxane. The mixture was polymerized for 1 hour at 130° C. A polymer of [η]=0.7 was in 79.5% yield.

EXAMPLE 15

Example 14 was repeated at the polymerization temperature of 120° C. A polymer of [η]=0.9 was obtained in 75.8% yield.

EXAMPLE 16

Example 15 was repeated by adding 0.005% of iodine instead of 0.025%. A polymer of [η]=2.2 was obtained in 48.1% yield.

EXAMPLE 17

Example 15 was repeated by employing irradiation of ultraviolet light from a mercury lamp (Toshiba H400-P Type). A polymer of [η]=1.6 was obtained in 89.2% yield.

EXAMPLE 18

Two (2) grams of tetraoxane was melted at 120° C. and iodine dissolved in cyclohexane was added to the molten tetraoxane in the amount of 0.025%. The mixture was polymerized at 120° C. for 1 hour. A polymer of [η]=2.4 was obtained in 81.6% yield.

EXAMPLE 19

One (1) gram of tetraoxane purified by sublimation was put in a glass ampoule, and iodine dissolved in cyclohexane was added in the amount of 0.01% by weight of tetraoxane, followed by addition of 5% of 1,3-dioxolane thereto. The ampoule was sealed and kept for 24 hours at room temperature.

Polymerization was carried out for 1 hour in a 105° C. heating bath. The product was washed with acetone in order to remove the remaining tetraoxane, initiator and additive, and dried at room temperature at a reduced pressure. A white crystalline polymer of viscosity [η]=2.6 and $K_{222}$=0.12%/min. was obtained in 93% yield. When no 1,3-dioxolane was added, the yield, [η] and $K_{222}$ of the polymer obtained were 95%, 4.4, and 0.9%/min. respectively.

EXAMPLE 20

Example 19 was repeated using 0.001% of iodine instead of 0.01% thereof. A polymer of $[\eta]=3.9$ and $K_{222}=0.05\%$/min. was obtained in 76.3% yield. Example 19 was further repeated using 3% of 1,3-dioxolane instead of 5% thereof. A polymer of $[\eta]=2.6$ and $K_{222}=0.06\%$/min. was obtained in 52% yield.

Polymerization was carried out by employed 3% of 1,3-dioxolane and 0.1% of methylal in addition to 0.001% of iodine, as in Example 19. A polymer of $[\eta]=2.0$ and $K_{222}=0.05\%$/min. was obtained in 52%. When 1,3-dioxolane and methylal were not employed in the above experiment, and yield, $[\eta]$ and $K_{222}$ of the polymer were 14%, 2.6, and 1.5%/min. respectively.

EXAMPLE 21

One (1) gram of purified tetraoxane was put in a glass ampoule, and iodine dissolved in cyclohexane was added in the amount of 0.0005% by weight of tetraoxane, followed by addition of 5% of 1,3-dioxolane thereto. The ampoule was sealed and was irradiated with $1\times10^6$ rad gamma rays from Co-60 at $-78°$ C., and then polymerization was carried out for 1 hour in a 105° C. heating bath. The product was treated as in Example 19. A polymer of $[\eta]=1.0$ and $K_{222}=0.2\%$/min. was obtained in 56% yield. When no 1,3-dioxolane was added, a polymer of $[\eta]=2.0$ and $K_{222}=1.0\%$/min. was obtained in 25% yield.

EXAMPLE 22

Example 21 was repeated, but the reactants were heated in a 100° C. bath for 1 hour and simulaneously irradiated with gamma rays from Co-60 at the dose rate of $1\times10^5$ rad/hr. in the course of polymerization. A polymer of $[\eta]=0.8$ and $K_{222}=0.4\%$/min. was obtained in 48% yield.

EXAMPLE 23

To a 1 gram of purified tetraoxane, 0.001% of iodine and 3% of methylal were admixed. The mixture was polymerized at 105° C. for 1 hour. A polymer of $[\eta]=0.5\%$ and $K_{222}=0.07\%$/min. was obtained in 65% yield.

EXAMPLE 24

Example 23 was repeated using a mixture consisting of 1 gram of purified tetraoxane, 0.001% of iodine, 1% of methylol and 5% of 1,3-dioxolane. A polymer of $[\eta]=0.8$ and $K_{222}=0.04\%$/min. was obtained in 90% yield.

EXAMPLE 25

One (1) gram of purified tetraoxane was melted at 120° C., and 0.001% of iodine and 5% of 1,3-dioxolane were added thereto. The mixture was polymerized at 120° C. for 1 hour. A polymer of $[\eta]=0.2$ and $K_{222}=0.6\%$/min. was obtained in 6.5% yield.

When the above experiment was repeated by irradiating the mixture with gamma rays from Co-60 at the dose rate of $1\times10^5$ rad/hr. for 1 hour in the course of polymerization, a polymer of $[\eta]=0.7$ and $K_{222}=0.5\%$/min. was obtained in 32% yield. When no 1,3-dioxolane was added, the polymerization yield was 52.3% and $[\eta]$ and $K_{222}$ of the polymer were 0.4 and 1.4%/min. respectively.

EXAMPLE 26

One (1) gram of purified tetraoxane to which 1 gram of nitrobenzene had been added was melted at 120° C., and 0.001% of iodine and 3% of methylal were added thereto. The mixture was polymerized at 120° C. for 1 hour. A polymer of $[\eta]=0.2$ and $K_{222}=0.5\%$/min. was obtained in 25% yield.

The above experiment was repeated by irradiating the mixture with gamma rays from Co-60 at the dose rate of $1\times10^5$ rad/hr. for 1 hour in the course of polymerization. A polymer of $[\eta]=0.2$ and $K_{222}=0.4\%$/min. was obtained in 40% yield.

EXAMPLE 27

One (1) gram of tetraoxane purified by sublimation was put in a glass ampoule and 0.1% of bromine was added thereto. The ampoule was sealed and kept at room temperature for 24 hours. The mixture was polymerized for 2 hours in a 105° C. heating bath. The product was washed with acetone in order to remove unreacted tetraoxane and bromine, and dried at room temperature at a reduced pressure. A crystalline polymer of $[\eta]=1.3$ was obtained in 96% yield.

EXAMPLE 28

One (1) gram of purified tetraoxane was put in a glass ampoule, and bromine dissolved in n-hexane (as 1% by weight solution) was added thereto in the amount of 0.01% by weight of tetraoxane. The ampoule was sealed and kept at room temperature for 24 hours. The mixture was then polymerized for 2 hours in a 105° C. heating bath. A crystalline polymer of $[\eta]=1.5$ was obtained in 92% yield.

EXAMPLE 29

To 1 gram of purified tetraoxone, bromine dissolved in cyclohexane (as 1% by weight solution) was added in the amount of 0.001%. The ampoule was sealed and irradiated with $1\times10^5$ rad gamma rays from Co-60 at $-78°$ C. The irradiated mixture was polymerized for 2 hours in a 105° C. heating bath. A crystalline polymer of $[\eta]=1.5$ was obtained in 92% yield.

The above experiment was repeated by irradiating tetraoxane first and adding bromine thereto. A crystalline polymer of $[\eta]=1.5$ was obtained in 87% yield.

For comparison, polymerization was carried out with irradiation in the absence of bromine. The yield and viscosity of the polymer obtained were 37% and 2.2 respectively. When polymerization was effected without irradiation in the presence of bromine, a polymer of $[\eta]=1.4$ was obtained in 19% yield.

EXAMPLE 30

To 1 gram of purified tetraoxane, 0.001% of bromine was added. The mixture was kept at room temperature for 48 hours and then irradiated with gamma rays from Co-60 at the dose rate of $5\times10^4$ rad/hr. at 90° C. for 1 hour. A crystalline polymer of $[\eta]=1.3$ was obtained in 38% yield.

For comparison, polymerization was carried out with irradiation in the absence of bromine in the same way as in the above experiment. The yield and $[\eta]$ of the polymer obtained were 25% and 1.1 respectively.

EXAMPLE 31

One (1) gram of purified tetraoxane was put in a glass ampoule and 0.01% of bromine was added. The ampoule was sealed and kept at room temperature for 24 hours, and then heated in a 130° C. heating bath. Tetraoxane was quickly polymerized and the yield reached 88% in 2 hours. The viscosity $[\eta]$ of the polymer was 1.0.

EXAMPLE 32

One (1) gram of tetraoxane was melted at 120° C., and 0.01% of bromine was added thereto. The molten mixture was irradiated with gamma rays from Co-60 at the dose rate of $5\times10^4$ rad/hr. for 1 hour at 120° C. A polymer of $[\eta]=1.1$ was obtained in 96% yield. When the above experiment was repeated in the absence of bromine, no polymer was obtained.

EXAMPLE 33

One (1) gram of tetraoxane was put in a glass ampoule, and bromine dissolved in cyclohexane (as 1% by weight solution) was added in the amount of 0.001%. Five (5)% of 1,3-dioxolane, which had been purified by treatment with sodium metal and distillation so as to reduce the proportion of impurities to less than 0.1%, was added thereto. The ampoule was sealed and kept at room temperature for 24 hours. The mixture was polymerized for 2 hours in a 105° C. heating bath. The product was washed with acetone to remove unreacted tetraoxane, initiator and additive, and dried at room temperature at a reduced pressure. A white crystalline polymer of $[\eta]=1.6$ and $K_{222}=0.30\%/min.$ was obtained in 80% yield.

The above experiment was repeated in the absence of 1,3-dioxolane, the yield, $[\eta]$ and $K_{222}$ of the polymer obtained were 19%, 1.5, and 1.6%/min. respectively.

EXAMPLE 34

Example 33 was repeated by employing 0.0001% of bromine instead of 0.001% thereof. A polymer of $[\eta]=1.8$ and $K_{222}=0.45\%/min.$ was obtained in 39% yield.

EXAMPLE 35

Example 34 was repeated except that the mixture was irradiated at −78° C. with $1\times10^5$ rad gamma rays from Co-60 prior to the polymerization. A polymer of $[\eta]=1.3$ and $K_{222}=0.30\%/min.$ was obtained in 82% yield.

EXAMPLE 36

To 1 gram of purified tetraoxane, 0.0001% of bromine and 1% of methylal which had been purified as in Example 33 were added. The mixture was kept at room temperature for 24 hours and then polymerized for 2 hours in a 105° C. heating bath. A polymer of $[\eta]=1.2$ and $K_{222}=0.40\%/min.$ was obtained in 87% yield.

EXAMPLE 37

One (1) gram of purified tetraoxane to which 1 gram of nitrobenzene had been added was melted at 120° C., and 0.001% of bromine and 1% of methylal which was purified as in Example 33 were added thereto. The mixture was polymerized at 120° C. for 2 hours. A polymer of $[\eta]=0.4$ and $K_{222}=0.61\%/min.$ was obtained in 23% yield.

EXAMPLE 38

One (1) gram of tetraoxane purified by sublimation was put in a glass ampoule, and 0.001% of bromine, 4% of 1,3-dioxolane and 1% of methylal, said dioxolane and methylal having been purified as in Example 33, were added thereto. The ampoule was sealed and kept at room temperature for 20 hours. The mixture was polymerized for 2 hours in a 105° C. heating bath. A polymer of $[\eta]=1.0$ and $K_{222}=0.20\%/min.$ was obtained in 90% yield.

EXAMPLE 39

One (1) gram each of tetraoxane purified by sublimation was put in a glass ampoule and a mixture of a halogenohydrocarbon and iodine or bromine which had been dissolved in cyclohexane was added thereto as shown in Table 1. The ampoule was sealed and heated for 1 hour in a 105° C. heating bath for polymerization. After the polymerization, the product was washed with acetone to remove unreacted tetraoxane and dried at room temperature at a reduced pressure. A white crystalline polymer was obtained. The polymerization conditions and results are shown in Table 1.

TABLE 1

| Number | Polymerization conditions | | Solvent for initiator (percent) (cyclohexane) | Results | |
|---|---|---|---|---|---|
| | Halogenohydrocarbon (percent) | Halogen (percent) | | Yield (percent) | Viscosity $[\eta]$ |
| 1-2 | Methylene chloride, 0.1 | Iodine, $1\times10^{-3}$ | 3 | 44 | 1.5 |
| 1-1 (control) | do | | | <1 | |
| 1-3 | Methylene chloride, 1.0 | Iodine, $1\times10^{-3}$ | 3 | 50 | 1.8 |
| 1-2 (control) | do | | | 9 | 0.4 |
| 1-5 | Methyl iodide, $1\times10^{-3}$ | Bromine, $1\times10^{-3}$ | 3 | 70 | 1.6 |
| 1-3 (control) | do | | 3 | 5 | 3.2 |
| 1-6 | Methyl iodide, 1.0 | Iodine, $1\times10^{-3}$ | 3 | 92 | 3.2 |
| 1-4 (control) | do | | | 26 | 2.7 |
| 1-7 | Bromoform, $1\times10^{-4}$ | Bromine, $1\times10^{-4}$ | 3 | 65 | 1.3 |
| 1-5 (control) | Bromoform, $1\times10^{-4}$ | | 3 | 4 | |
| 1-8 | Bromoform, $1\times10^{-3}$ | Iodine, $1\times10^{-3}$ | 3 | 13 | 1.1 |
| 1-9 | do | Bromine, $1\times10^{-3}$ | 3 | 85 | 1.6 |
| 1-6 (control) | do | | 3 | 5 | 1.0 |
| 1-8 (control) | | Iodine, $1\times10^{-3}$ | 3 | 14 | 2.5 |
| 1-9 (control) | | Bromine, $1\times10^{-4}$ | 3 | 10 | 1.1 |
| 1-10 (control) | | Bromine, $1\times10^{-4}$ | 3 | 15 | 1.0 |

EXAMPLE 40

One (1) gram each of tetraoxane purified by sublimation was put in a glass ampoule, and a mixture of a halogenohydrocarbon and iodine or bromine was added thereto. Each ampoule was heated for 1 hour at 90°, 120° or 130° C. for polymerization. A white crystalline polymer was obtained after treating the product as in Example 39. The conditions and results are shown in Table 2.

TABLE 2

| Number | Polymerization conditions | | | Results | |
|---|---|---|---|---|---|
| | Halogenohydrocarbon (percent) | Halogen (percent) added as a cyclohexane solution | Temperature (° C.) | Yield (percent) | Viscosity $[\eta]$ |
| 2-1 | Methylene chloride, 1.0 | Iodine, 0.001 | 90 | 20 | 0.7 |
| 2-2 | do | Iodine, 0.001 | 120 | 89 | 0.8 |
| 2-1 (control) | do | | 120 | 15 | 0.7 |
| 2-3 | Methyl iodide, 1.0 | Iodine, 0.001 | 130 | 97 | 0.6 |
| 2-4 | do | Bromine, 0.001 | 130 | 100 | 0.8 |
| 2-5 | do | do | 120 | 50 | 1.0 |
| 2-6 | Bromoform, 1.0 | Iodine, 0.0001 | 90 | 74 | 0.1 |
| 2-7 | do | do | 120 | 96 | 0.2 |
| 2-2 (control) | do | | 90 | 48 | 0.4 |
| 2-3 (control) | | Iodine, 0.001 | 90 | 10 | |
| 2-4 (control) | | Bromine, 0.001 | 130 | 34 | 0.5 |

EXAMPLE 41

One (1) gram of tetraoxane purified by sublimation was put in a glass ampoule, and a mixture of a halogenohydrocarbon and iodine or bromine was added thereto. Polymerization was carried out in liquid phase and a white crystalline polymer was obtained after treating the product as in Example 39. The conditions and results are shown in Table 3.

TABLE 3

| Number | Polymerization conditions | | | | Results | |
|---|---|---|---|---|---|---|
| | Halogenohydrocarbon (percent) | Halogen (percent) | Temperature (°C.) | Time (hr.) | Yield (percent) | Viscosity ($\eta$) |
| 3-1 | Methylene chloride, 1.0 | Bromine, 0.01 | 120 | 1 | 80 | 0.6 |
| 3-2 | do | do | 130 | 1 | 79 | 0.6 |
| 3-3 | Methyl iodide, 1.0 | Iodine, 0.001 | 120 | 1 | 72 | 1.8 |
| 3-4 | do | Bromine, 0.001 | 130 | 1 | 50 | 1.6 |

EXAMPLE 42

One (1) gram of tetraoxane purified by recrystalization was dissolved in 1.5 grams of nitrobenzene, and a mixture of a halogenohydrocarbon and iodine or bromine was added thereto. Polymerization was carried out in liquid phase for 1 hour and a white crystalline polymer was obtained. The conditions and results are shown in Table 4.

TABLE 4

| Number | Ploymerization conditions | | | | Results | |
|---|---|---|---|---|---|---|
| | Halogenohydrocarbon (percent) | Halogen (percent) | Temperature (°C.) | | Yield (percent) | Viscosity ($\eta$) |
| 4-1 | Methylene chloride, 1.0 | Bromine, 0.01 | 90 | | 80 | 1.2 |
| 4-2 | do | do | 105 | | 98 | 1.0 |
| 4-3 | do | do | 120 | | 99 | 0.8 |
| 4-4 | Methyliodide, 1.0 | Iodine, 0.01 | 105 | | 23 | 1.5 |
| 4-5 | do | Bromine, 0.001 | 105 | | 59 | 1.2 |
| 4-6 | do | do | 120 | | 93 | 0.9 |

EXAMPLE 43

One (1) gram of tetraoxane purified by sublimation was put in a glass ampoule, and a solution of 0.2% of methyl iodide and 0.001% of iodine dissolved in 3% of cyclohexane respectively by weight of tetraoxane was added thereto. The ampoule was sealed and heated for 1 hour at 105° C. for polymerization. A white crystalline polymer of $[\eta]=3.6$ and $K_{222}=0.08\%$/min. was obtained in 71% yield, after treating the product as in Example 39.

EXAMPLE 44

One (1) gram of tetraoxane purified by sublimation was put in a glass ampoule, followed by addition of 1% of methylal together with a halogenohydrocarbon and iodine or bromine dissolved in cyclohexane respectively in the amounts as given in Table 5. The ampoule was sealed and heated for 1 hour at 105° C. for polymerization. The product was washed with acetone to remove unreacted tetraoxane and dried at room temperature at a reduced pressure. The conditions and results are shown in Table 5.

TABLE 5

| Number | Initiators (percent) | | Solvent (percent) (cyclohexane) | Results | | |
|---|---|---|---|---|---|---|
| | Halogenohydrocarbon | Halogen | | Yield (percent) | $[\eta]$ | $K_{222}$ |
| 5-1 | Methyl iodide, 0.05 | Iodine, 5×10⁻⁴ | 1 | 24.5 | 0.4 | 0.16 |
| 5-2 | do | Bromine, 1×10⁻⁴ | 1 | 21.5 | 0.3 | 0.25 |
| 5-1 (control) | do | | | 0.9 | | |
| 5-3 | Bromoform, 0.05 | Iodine, 5×10⁻⁴ | 1 | 72.0 | 3.5 | 0.24 |
| 5-4 | do | Bromine, 1×10⁻⁴ | 1 | 97.0 | 0.5 | 0.25 |
| 5-2 (control) | do | | | 26.1 | | |
| 5-5 | Methyl iodide, 0.05 | Iodine, 5×10⁻⁴ | | 51.8 | 0.3 | 0.20 |
| 5-6 | do | Bromine, 1×10⁻⁴ | | 67.2 | 1.5 | 0.28 |
| 5-3 (control) | do | | | 33.3 | 0.6 | 0.18 |
| 5-4 (control) | | Iodine, 5×10⁻⁴ | 1 | 15.6 | 0.3 | 0.29 |
| 5-5 (control) | | Bromine, 1×10⁻⁴ | | 18.7 | 0.2 | 0.25 |

EXAMPLE 45

One (1) gram of tetraoxane was put in a glass ampoule, followed by addition of 5% of 1,3-dioxolane together with a halogenohydrocarbon and iodine or bromine dissolved in cyclohexane respectively in the amounts as given in Table 6. The ampoule was sealed and heated at 105° C. for 1 hour for polymerization. The unreacted tetraoxane was removed as in Example 44. The polymerization conditions and results are shown in Table 6.

TABLE 6

| Number | Initiators (percent) | | Solvent (percent) (cyclohexane) | Results | | |
|---|---|---|---|---|---|---|
| | Halogenohydrocarbon | Halogen | | Yield (percent) | $[\eta]$ | $K_{222}$ |
| 6-1 | Methylene chloride, 0.05 | Iodine, 5×10⁻⁴ | 1 | 51.4 | 1.7 | 0.12 |
| 6-1 (control) | do | | | 0.2 | | |
| 6-2 | Methyl iodide, 0.05 | Iodine, 5×10⁻⁴ | 1 | 75.0 | 3.4 | 0.06 |
| 6-3 | do | Bromine, 1×10⁻⁴ | 1 | 51.5 | 0.9 | 0.20 |
| 6-2 (control) | do | | | 37.2 | 1.8 | 0.13 |

EXAMPLE 46

One (1) gram of tetraoxane was put in a glass ampoule, followed by addition of 5% of 1,3-dioxolane and 0.1% of methylal together with methyl iodide and iodine dissolved in cyclohexane respectively in the amounts as given in Table 7. The polymerization and treatment were effected as in Example 44. The conditions and results are shown in Table 7.

TABLE 7

| Number | Initiators (percent) Halogenohydrocarbon | Halogen | Solvent (percent) (cyclohexane) | Results Yield (percent) | $[\eta]$ | $K_{222}$ |
|---|---|---|---|---|---|---|
| 7 | Methyl iodide, 0.05 | Iodine, 5×10⁻⁴ | 1 | 83.8 | 1.4 | 0.05 |
| 7–1 (control) | do | do | | 45.0 | 1.6 | 0.12 |
| 7–2 (control) | | Iodine, 5×10⁻⁴ | 1 | 10.0 | 1.2 | 0.25 |

EXAMPLE 47

One (1) gram of tetraoxone purified by sublimation was put in a glass ampoule and melted at 120° C. Methyl iodide and iodine dissolved in cyclohexane were added thereto respectively in the amounts as given in Table 8, together with 5% of 1,3-dioxolane. The mixture was heated for 1 hour at 120° C. for polymerization and then treated as in Example 44. The conditions and results are shown in Table 8.

TABLE 8

| Number | Initiators (percent) Halogenohydrocarbon | Halogen | Solvent (percent) (cyclohexane) | Results Yield (percent) | $[\eta]$ | $K_{222}$ |
|---|---|---|---|---|---|---|
| 8 | Methyl iodide, 0.5 | Iodine, 1×10⁻³ | 1 | 46.3 | 1.2 | 0.3 |
| 8–1 (control) | do | | | 23.5 | 1.0 | 0.5 |

EXAMPLE 48

One (1) gram of tetraoxane purified by sublimation was dissolved in 1 ml. of nitrobenzene, followed by addition of methyl iodide and iodine dissolved in cyclohexane respectively in the amounts as given in Table 9, together with 1% of methylal. The mixture was polymerized for 1 hour at 120° C. in liquid phase, and then treated as in Example 44. The conditions and results are shown in Table 9.

TABLE 9

| Number | Initiators (percent) Halogenohydrocarbon | Halogen | Solvent (percent) (cyclohexane) | Results Yield (percent) | $[\eta]$ | $K_{222}$ |
|---|---|---|---|---|---|---|
| 9 | Methyl iodide, 0.5 | Iodine, 1×10⁻³ | 1 | 75.0 | 0.3 | 0.5 |
| 9–1 (control) | do | | | 18.0 | 0.2 | 0.6 |
| 9–2 (control) | | Iodine, 1×10⁻³ | 1 | 21.5 | 0.2 | 0.8 |

EXAMPLE 49

One (1) gram of tetraoxane purified by sublimation was put in a glass ampoule, followed by addition of iodine dissolved in cyclohexane, methyl iodide and methylal or 1,3-dioxolane, said methylal or dioxolane having been purified by treatment with sodium metal and distillation so as to reduce the proportion of impurities to less than 0.1%, respectively in the amounts as given in Table 10. The mixture was polymerized for 1 hour at 105° C. and then treated as in Example 44. The polymerization conditions and results are shown in Table 10.

What is claimed is:

1. A process for polymerizing tetraoxane at a temperature ranging from 30° C. to 150° C. in the presence of chemicals selected from the groups (1) to (4) as specified below;
   (1) iodine or bromine,
   (2) iodine or bromine and a halogenohydrocarbon,
   (3) iodine or bromine and at least one acetal,
   (4) iodine or bromine and a halogenohydrocarbon and at least one acetal;
the amount of iodine or bromine being 10⁻⁵–1% by weight of tetraoxane.

2. A process as set forth in claim 1, in which the amount of a halogenohydrocarbon is 10⁻⁵–5% by weight of tetraoxane and the amount of an acetal or acetals is 10⁻³–15% by weight of tetraoxane.

3. A process as set forth in claim 1, in which polymerization is carried out in solid phase.

4. A process as set forth in claim 1, in which polymerization is further promoted by employing an ionizing radiation or an ultraviolet light.

5. A process as set forth in claim 1, in which tetraoxane is irradiated by an ionizing radiation or an ultraviolet light, and then said chemicals are added to the irradiated tetraoxane, and the mixture is polymerized in solid phase.

6. A process as set forth in claim 1, in which the mixture of tetraoxane and said chemicals is irradiated by an ionizing radiation or an ultraviolet light, and then polymerized in solid phase.

7. A process as set forth in claim 1, in which said halogenohydrocarbon is represented by the following general formula:

$$RX_n$$

wherein R is a radical having 1 to 15 carbon atoms selected from the group consisting of a saturated or unsaturated aliphatic hydrocarbon residue, a saturated or unsaturated alicyclic hydrocarbon residue and a radical in which any

TABLE 10

| Number | Initiators (percent) Acetal (percent) | Halogenohydrocarbon | Halogen | Solvent (percent) (cyclohexane) | Results Yield (percent) | $[\eta]$ | $K_{222}$ |
|---|---|---|---|---|---|---|---|
| 10–1 (control) | | Methyl iodide, 0.1 | Iodine, 1×10⁻³ | | 27.4 | | 1.5 |
| 10–2 (control) | | do | | | 7.0 | | 1.6 |
| 10–3 (control) | | | Iodine, 1×10⁻³ | 1 | 14 | | 1.6 |
| 10–1 | Dioxolane, 5 | Methyl iodide, 0.1 | do | | 82.5 | 4.5 | 0.04 |
| 10–4 (control) | do | do | | | 45.1 | 1.3 | 0.23 |
| 10–5 (control) | do | | Iodine, 1×10⁻³ | 1 | 76.3 | 3.9 | 0.04 |
| 10–2 | Methylal, 1 | Methyl iodide, 0.1 | do | | 74.1 | 0.5 | 0.21 |
| 10–6 (control) | do | do | | | 68.6 | 1.4 | 0.25 |
| 10–7 (control) | do | do | | Iodine, 1×10⁻³ | 1 | 27.1 | 0.4 | 0.25 | hydrogen atom of the residues is substituted for aryl, alkoxy, carbonyl, alkoxycarbonyl or aryloxycarbonyl radical; X is the same or different kind of halogen atoms selected from the group consisting of F, Cl, Br and I; and $n$ is a positive integer not exceeding 10.

8. A process as set forth in claim 7, in which said halogenohydrocarbon is selected from the group consisting of methylene chloride, ethylene chloride, chloroform, carbon tetrachloride, vinyl chloride, chloral, chloroacetone, chloromethyl acetate, phenyl chloroacetate, hexachloroethane, benzyl chloride, tetrafluoroethylene, dibromotetrafluoroethane, bromoform, tribromoacetaldehyde, aryl bromide, methyl bromide, ethyl bromide, methylene bromide, ethylene bromide, bromal, bromopropene, bromocyclohexane, chlorocyclohexane, benzyl bromide, methyl iodide, ethyl iodide, propyl iodide, isopropyl iodide, ethylene iodide, benzyl iodide, iodoform, 2-bromoethyl ethyl ether, chloromethyl ethyl ether, 2-chloroethyl ether, 3-bromocyclohexene, 3-chlorocyclohexene, and 4-chlorocyclohexene.

9. A process as set forth in claim 8, in which polymerization is further promoted by an ionizing radiation or an ultraviolet light.

10. A process as set forth in claim 1, in which said acetal is represented by the following general Formula I and/or II:

(I) 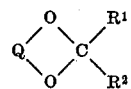

wherein Q is a member selected from the group consisting of an unsubstituted or substituted aliphatic hydrocarbon residue having 2 to 10 carbon atoms and an unsubstituted or substituted aliphatic hydrocarbon residue containing C—O—C linkages and having 2 to 10 carbon atoms, the substituent on the aliphatic hydrocarbon residue being selected from the group consisting of alkyl, alkenyl, phenyl, and halogens; and $R^1$ and $R^2$ each are members selected from the group consisting of a hydrogen atom or an aliphatic hydrocarbon residue having 1 to 3 carbon atoms;

(II) 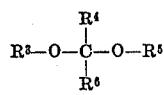

wherein $R^3$ and $R^5$ each are members selected from the group consisting of an aliphatic hydrocarbon residue having 1 to 4 carbon atoms and a substituted aliphatic hydrocarbon residue having 1 to 8 carbon atoms, the substituent being selected from the group consisting of alkyl, alkoxy, and halogens; and $R^4$ and $R^6$ each are members selected from the group consisting of a hydrogen atom and an aliphatic hydrocarbon residue having 1 to 3 carbon atoms.

11. A process as set forth in claim 10, in which said acetal is selected from the group consisting of dimethoxymethane (methylal), diethoxymethane (ethylal), 1,1-dimethoxyethane, 1,1-diethoxyethane, 1,1-diethoxypropane, dipropoxymethane, dibutoxymethane, methoxybutoxymethane, 1,1-dibutoxypropane, 1,1-diethoxybutane, 2,2-dimethoxypropane, 1,3-dioxolane, 1,3-dioxane, 1,3-dioxepane, 1,3-dioxecane, 1,3,5 - trioxepane, 1,3,6 - trioxocane, 4-methyl-1,3-dioxolane, 4 - phenyl-1,3-dioxane, 5-ethyl-4-phenyl-1,3-dioxane, 4 - methyl - 4 - phenyl-1,3-dioxane, 2-methyl-4-methylene-1,3-dioxolane, 1,3 - dioxep - 5 - ene, 1,3-dioxen-6-ene, 5-ethyl-1,3-dioxep - 5 - ene, and 2 - isopropyl-1,3-dioxep-5-ene.

12. A process as set forth in claim 10, in which polymerization is further promoted by employing an ionizing radiation or an ultraviolet light.

13. A process as set forth in claim 1, in which both an acyclic acetal and a cyclic acetal are employed.

14. A process as set forth in claim 13, in which polymerization is further promoted by employing an ionizing radiation or an ultraviolet light.

15. An oxymethylene polymer which is prepared by polymerizing tetraoxane at a temperature ranging from 30° C. to 150° C. in the presence of chemical selected from the groups (1) to (4) as specified below;
(1) iodine or bromine,
(2) iodine or bromine and a halogenohydrocarbon,
(3) iodine or bromine and at least one acetal,
(4) iodine or bromine and a halogenohydrocarbon and at least one acetal;
the amount of iodine or bromine being $10^{-5}$–1%, the amount of a halogenohydrocarbon being $10^{-5}$–5%, and the amount of an acetal or acetals being $10^{-3}$–15% respectively by weight of tetraoxane.

16. An oxymethylene polymer as set forth in claim 15, which is prepared by carrying out the polymerization in solid phase.

17. An oxymethylene polymer as set forth in claim 15, which is prepared by employing both an acyclic acetal and a cyclic acetal.

18. An oxymethylene polymer as set forth in claim 15, in which said halogenohydrocarbon is selected from the group consisting of methylene chloride, ethylene chloride, chloroform, carbon tetrachloride, vinyl chloride, chloral, chloroacetone, chloromethyl acetate, phenyl chloroacetate, hexachloroethane, benzyl chloride, tetrafluoroethylene, dibromotetrafluoroethane, bromoform, tribromoacetaldehyde, aryl bromide, methyl bromide, ethyl bromide, methylene bromide, ethylene bromide, bromal, bromopropene, bromocyclohexane, chlorocyclohexane, benzyl bromide, methyl iodide, ethyl iodide, propyl iodide, isopropyl iodide, ethylene iodide, benzyl iodide, iodoform, 2-bromoethyl ethyl ether, chloromethyl ethyl ether, 2-chloroethyl ether, 3-bromocyclohexene, 3-chlorocyclohexene, and 4-chlorocyclohexene.

19. An oxymethylene polymer as set forth in claim 15, in which said acetal is selected from the group consisting of dimethoxymethane (methylal), diethoxymethane (ethylal), 1,1 - dimethoxyethane, 1,1 - diethoxyethane, 1,1-diethoxypropane, dipropoxymethane, dibutoxymethane, methoxybutoxymethane, 1,1-dibutoxypropane, 1,1-diethoxybutane, 2,2-dimethoxypropane, 1,3-dioxolane, 1,3-dioxane, 1,3-dioxecane, 1,3,5-trioxepane, 1,3,6-trioxocane, 4-methyl-1,3-dioxolane, 4-phenyl-1,3-dioxane, 5-ethyl-4-phenyl-1,3-dioxane, 4-methyl-4-phenyl-1,3-dioxane, 2-methyl-4-methylene-1,3-dioxolane, 1,3-dioxep-5-ene, 1,3-dioxen-6-ene, 5-ethyl-1,3-dioxep - 5 - ene, and 2-isopropyl-1,3-dioxep-5-ene.

20. An oxymethylene polymer as set forth in claim 15, which is prepared by carrying out the polymerization by means of an ionizing radiation or an ultraviolet light.

References Cited

"Free Radical Induces Cationic Polymerization," Chemical & Engineering News, Sept. 6, 1966, pp. 40–41.

Hayashi et al.: J. of Polymer Science: Part C, No. 4, pp. 839–848.

SAMUEL H. BLECH, Primary Examiner

R. B. TURER, Assistant Examiner

U.S. Cl. X.R.

260—67 FP